(12) United States Patent
Elliott

(10) Patent No.: US 7,665,490 B1
(45) Date of Patent: Feb. 23, 2010

(54) LOADER DEVICE FOR A HOPPER-FED PROCESSING MACHINE

(75) Inventor: Robert D. Elliott, Martinsville, IN (US)

(73) Assignee: Empirical Design, LLC, Martinsville, IN (US)

( * ) Notice: Subject to any disclaimer, the term of this patent is extended or adjusted under 35 U.S.C. 154(b) by 674 days.

(21) Appl. No.: 11/368,981

(22) Filed: Mar. 6, 2006

(51) Int. Cl.
*B28B 13/02* (2006.01)

(52) U.S. Cl. .................. 141/284; 141/266; 141/383; 222/168; 425/130

(58) Field of Classification Search .................. 141/340, 141/236, 247–248, 250, 266, 284, 383; 425/130, 425/131.1, 132; 222/167–168
See application file for complete search history.

(56) References Cited

U.S. PATENT DOCUMENTS

| | | | | |
|---|---|---|---|---|
| 2,833,443 A * | 5/1958 | Prickett et al. | ................ | 222/49 |
| 2,865,447 A * | 12/1958 | Kaufman | ................ | 222/163 |
| 4,131,670 A * | 12/1978 | Abate | ................ | 264/256 |
| 4,863,366 A * | 9/1989 | Kim | ................ | 425/376.1 |
| 5,096,302 A * | 3/1992 | Durina | ................ | 366/76.92 |
| 5,335,578 A * | 8/1994 | Lorden et al. | ................ | 86/45 |
| 7,462,020 B2 * | 12/2008 | Reinert | ................ | 417/532 |
| 2005/0265871 A1 * | 12/2005 | Reinert | ................ | 417/510 |

* cited by examiner

*Primary Examiner*—Gregory L Huson
*Assistant Examiner*—Nicolas A Arnett
(74) *Attorney, Agent, or Firm*—Michael A. Myers; Shumaker, Loop & Kendrick, LLP

(57) ABSTRACT

A loader device for a hopper-fed processing machine has a top plate pivotally secured to a bottom plate. The plates are attached between the processing equipment throat and the material hopper, or vacuum receiver/reservoir. As the top plate pivots upon the other, ports that extend through the plates control the flow of material from the hopper into the throat of the machine. The pivot design, a purge funnel, and a drain tube are additional features that save time, labor, and make switching of processing material quick and convenient without the use of tools.

20 Claims, 6 Drawing Sheets

LOADER DEVICE FOR A HOPPER-FED PROCESSING MACHINE

TECHNICAL FIELD OF THE INVENTION

This invention relates generally to machines where a hopper or vacuum receiver feeds material into the machine throat for processing and, more particularly, to a processing machine loader device and method of using the same.

BACKGROUND OF THE INVENTION

Hoppers, or vacuum receivers are usually mounted to the processing machine throat; and, the processing material, which is typically in the form of pellets or other flowable solid, is fed or free to flow by way of the hopper as needed into the machine where it is processed. Extruded plastics are a common example of such apparatus. In many applications, the same machine is used to produce different products. Since different products require different starting materials, the processing materials have to be changed often.

Another reason for frequent material changeover is due to short runs. Obviously, in certain instances only a small amount of product may be desirable. A constant switching of the processing material, therefore, goes hand-in-hand with machine operation. The exchange of material and set up are slow and produce machine downtime. The hopper must be removed allowing remaining material to be returned to the Gaylord, bag, or barrel. Tools are required, and remaining material is often wasted due to spillage during the changeover. Spilled material makes the work area dangerous and causes machine parts to bind and stick.

Hence, there remains a need for a processing machine loader device that saves time, material, and labor. The present invention is directed toward meeting this need.

SUMMARY OF THE INVENTION

The present invention relates to a loader device for a processing machine of the type wherein material is typically delivered to the throat of the machine by way of a hopper or vacuum receiver. The device includes a first plate adapted for supporting the hopper or vacuum receiver and a second plate adapted for securing to the machine. At least one port extends through the first plate, and at least one port extends through the second plate. The plates are pivotally secured together so that the first plate is free to pivot relative to the other plate between an operating position and a purging position.

In another aspect, the device includes securing means for securing the plates in the operating position, the purging position, or therebetween.

In yet another aspect of the invention, the device includes an arcuate cutout formed in the first plate. A shaft is secured to the second plate, and the cutout serves as a passage for the shaft when the first plate pivots relative to the second plate.

In still another aspect, the invention includes a method of feeding material into a processing machine of the type wherein the material is typically delivered to the throat of the machine by way of a hopper or vacuum receiver, and unused material is returned to a Gaylord, or barrel. The method includes the steps of securing between the vacuum receiver and machine throat at least a pair of plates. The plates are secured together by a pivot, and each plate has at least one port through which the material can flow. One of the plates is pivoted relative to the other into an operating position so that the ports are aligned, and material is free to flow from the vacuum receiver, through the ports, and into the throat of the machine. The plates are maintained in the operating position until a process is complete. The pivotal plate is pivoted between the operating position and a purging position so that the ports are not aligned, and the material cannot flow from the vacuum receiver, through the ports, and into the throat of the machine.

One object of the present invention is to provide an improved loader device for a hopper-fed processing machine. Related objects and advantages of the present invention will be apparent from the following description.

DESCRIPTION OF THE PREFERRED EMBODIMENT

Figure 1:
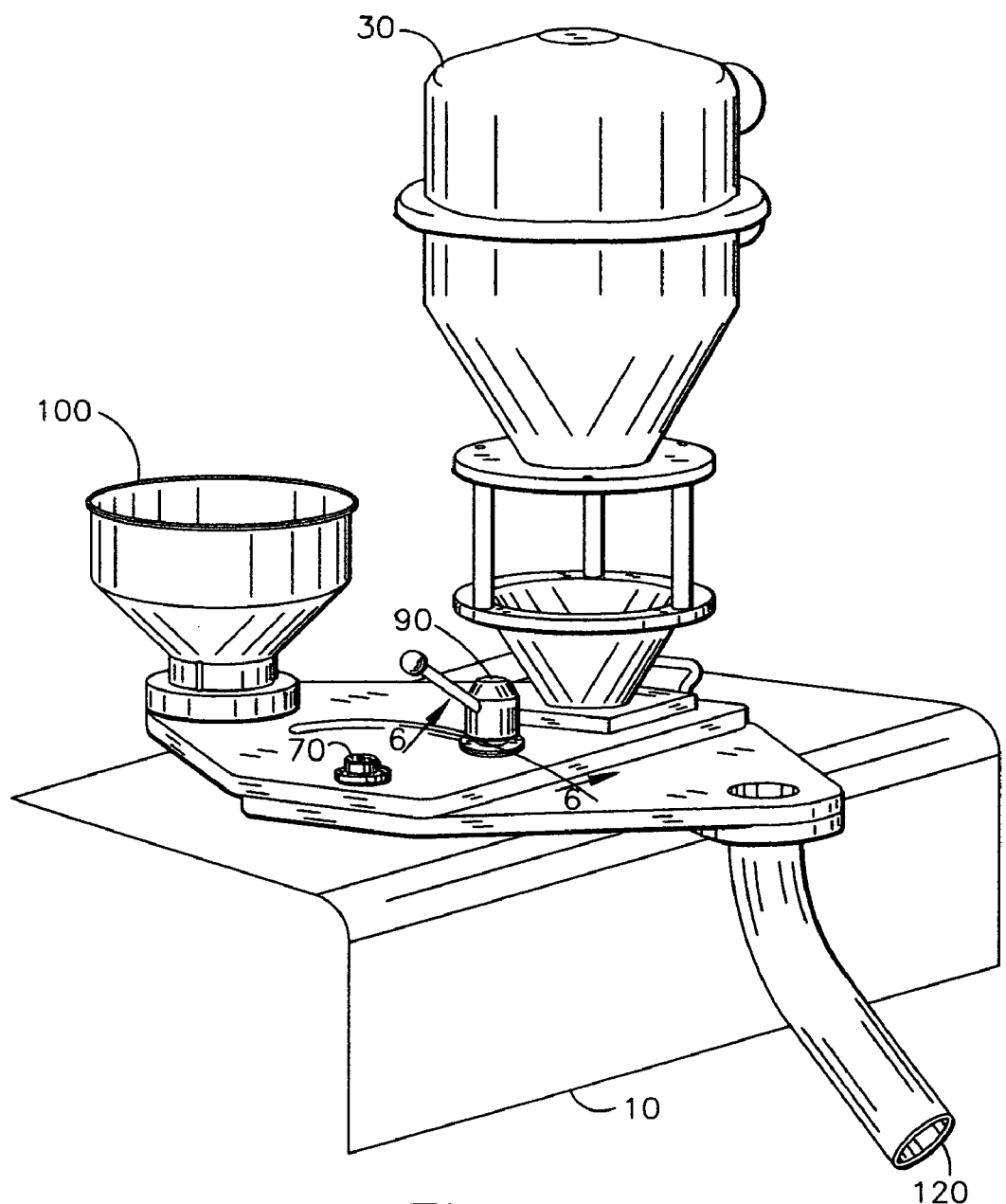
FIG. 1 is an elevated perspective view of the processing machine loader device shown in the operating position. The processing machine is shown schematically in fragmented view beneath the invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

With reference to the figures, the processing machine loader device 20 is for a processing machine 10 of the type wherein material is typically delivered to the throat of the machine by way of a hopper or vacuum receiver 30. One such machine, for example, is a plastics extrusion machine.

The loader device 20 includes a first top plate 40 and a second bottom plate 60 secured together by a pivot 70. The invention contemplates the use of additional plates stacked upon each other and secured together by pivot 70. One such plate assembly includes at least one additional plate positioned between the first and second plates. The same pivot 70 secures all three plates together such that the top two plates can pivot independently of each other relative to the bottom plate. In that embodiment, the two pivotal plates are each respectively adapted to support a corresponding hopper or vacuum receiver like the single plate configuration of FIGS. 1 and 2.

In another embodiment, the size of the top plate may be enlarged so as to accommodate an additional hopper or vacuum receiver. In each case, it should be recognized that the size and number of plates may be manipulated to fit a desired application.

In a preferred embodiment, the plates 40, 60 are formed from a rigid noncorrosive material that does not stain and wears well. In a more preferred embodiment, the plates are made of steel and have anti-friction portions 65 on at least one contacting surface, which permits one of the plates to easily slide against the other.

In the most preferred embodiment, the plates 40, 60 are formed from high quality cast fixture plating having a finish of 20 micro inches typical on both sides, and anti-friction portions 65 embedded in the top surface of the bottom plate 60. In that embodiment, anti-friction portions 65 are formed from Ultra High Molecular Weight (UHMW) polyethylene. Other anti-friction substances and coatings are also contemplated within the scope of the invention. One example of such material is commonly sold under the trademark "TEFLON."

Figure 4:
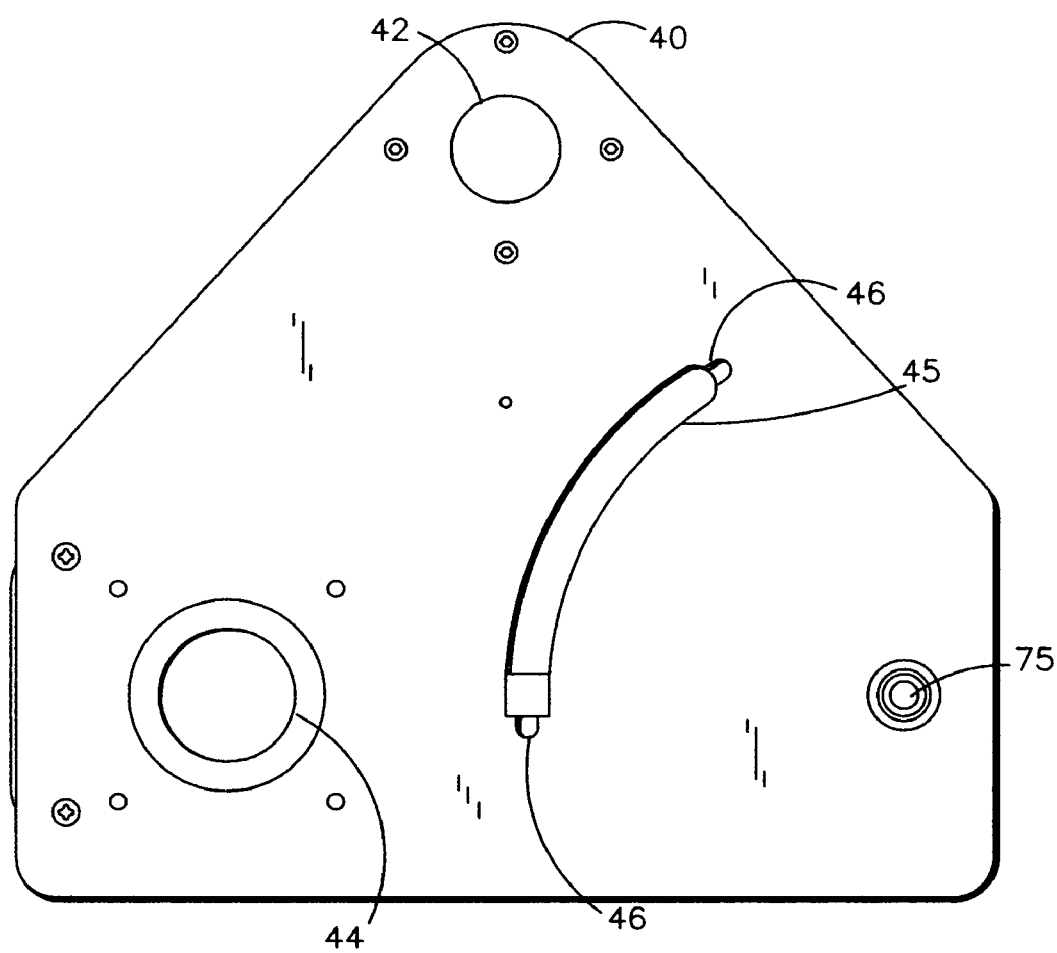
FIG. 4 is a bottom plan view of an embodiment of the top plate of the invention taken along lines 4-4 of FIG. 3.
Figure 5:
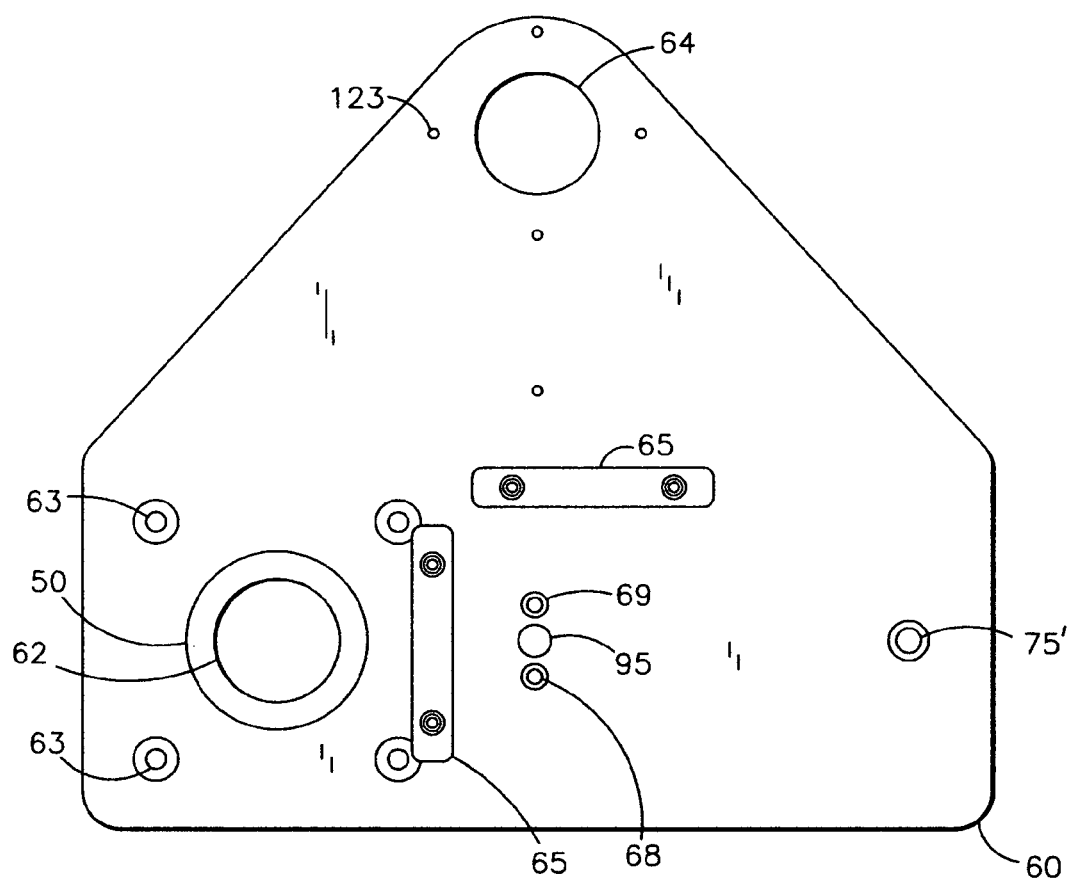
FIG. 5 is a top plan view of an embodiment of the bottom plate of the invention taken along lines 5-5 of FIG. 3.

Referring to FIGS. 4 and 5, first port 42 and a second port 44 extend through the top plate 40. A first port 62 and a second port 64 extend through the bottom plate 60 as well. Ports 44 and 62 include concentric inserts 50 formed from stainless steel, which prevents staining, corrosion, and wear. The diameter of ports 44 and 62 is accurately determined by the inserts 50 and may be customized for individual machines.

The top plate 40 includes an arcuate cut out 45, as shown in FIG. 4. A pivot bore 75 for receiving pivot 70 extends through the top plate 40. In the preferred embodiment, pivot action of the top plate 40 relative to the bottom plate 60 is achieved by way of pivot 70, which includes a threaded shaft 72 on which resides a bushing 74. A locking handle 90 secures the pivotal plate 40 in an operating position (FIG. 1), a purging position (FIG. 2), or therebetween.

Figure 3:
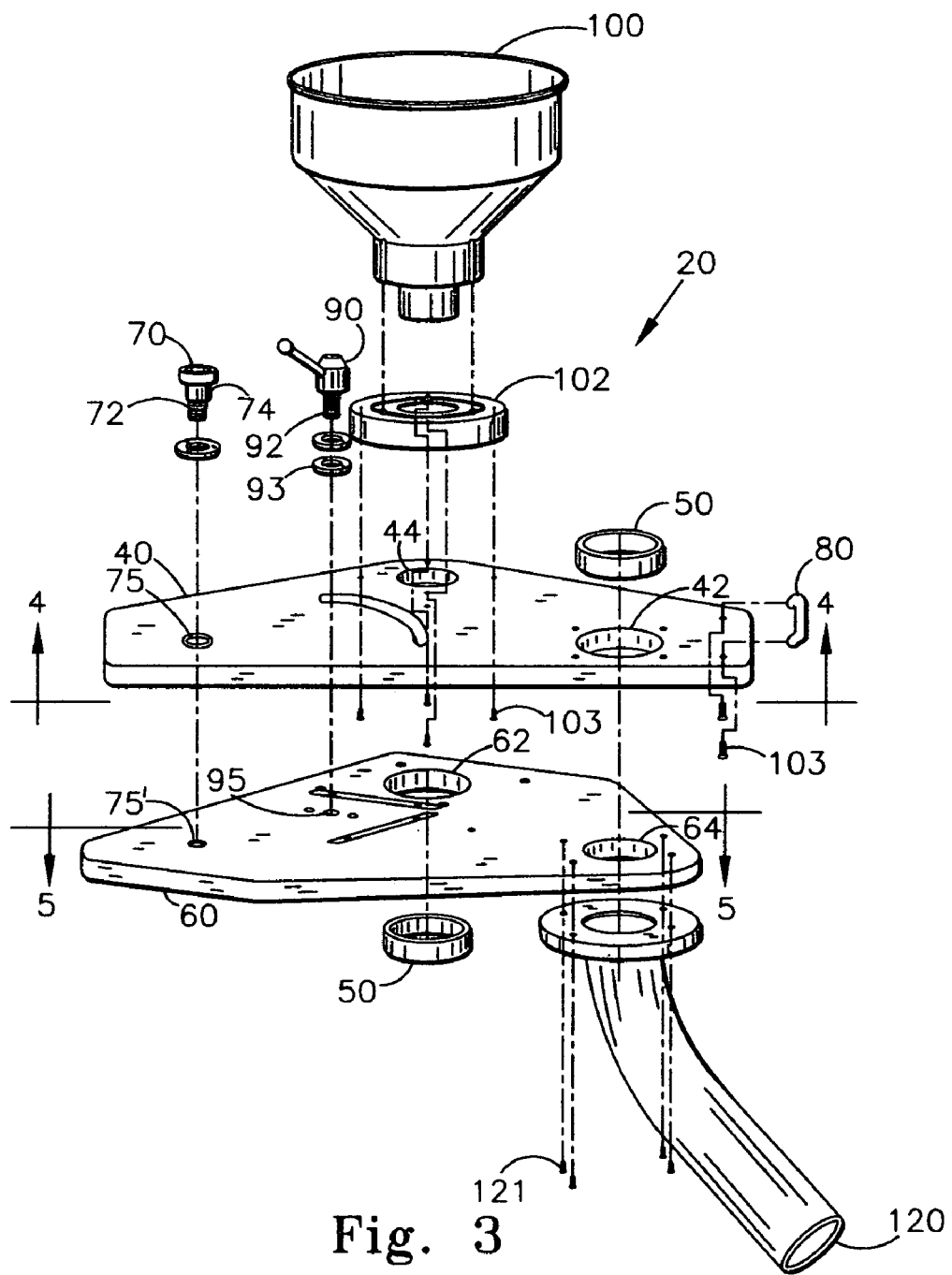
FIG. 3 is an elevational perspective view of the processing machine loader device shown disassembled.

The shaft 92 of the locking handle 90 extends through the cut out 45 and is received by threaded locking handle bore 95 in the bottom plate 60, as shown in FIG. 3. Accurate spacing between the handle and the top surface of the top plate 40 is achieved using washers 93.

Bolts 103 secure a handle 80 and a purge funnel mount 102 to the top plate 40. The purge funnel 100 rests in the mount 102.

Referring to FIG. 5, the bottom plate 60 includes a pivot bore 75' for receiving pivot 70. Mounting bores 63 are custom machined and extend through the bottom plate 60 to secure it to the processing machine 10 by known means. A drain tube 120 is secured underneath the second port 64 of the bottom plate 60 using screws 121 received by threaded holes 123. Passages 68 for retrieving waste material extend through the bottom plate 60 on both sides of locking handle bore 95. A chamfer 69 is formed around the lip of each of the passages 68.

Figure 2:
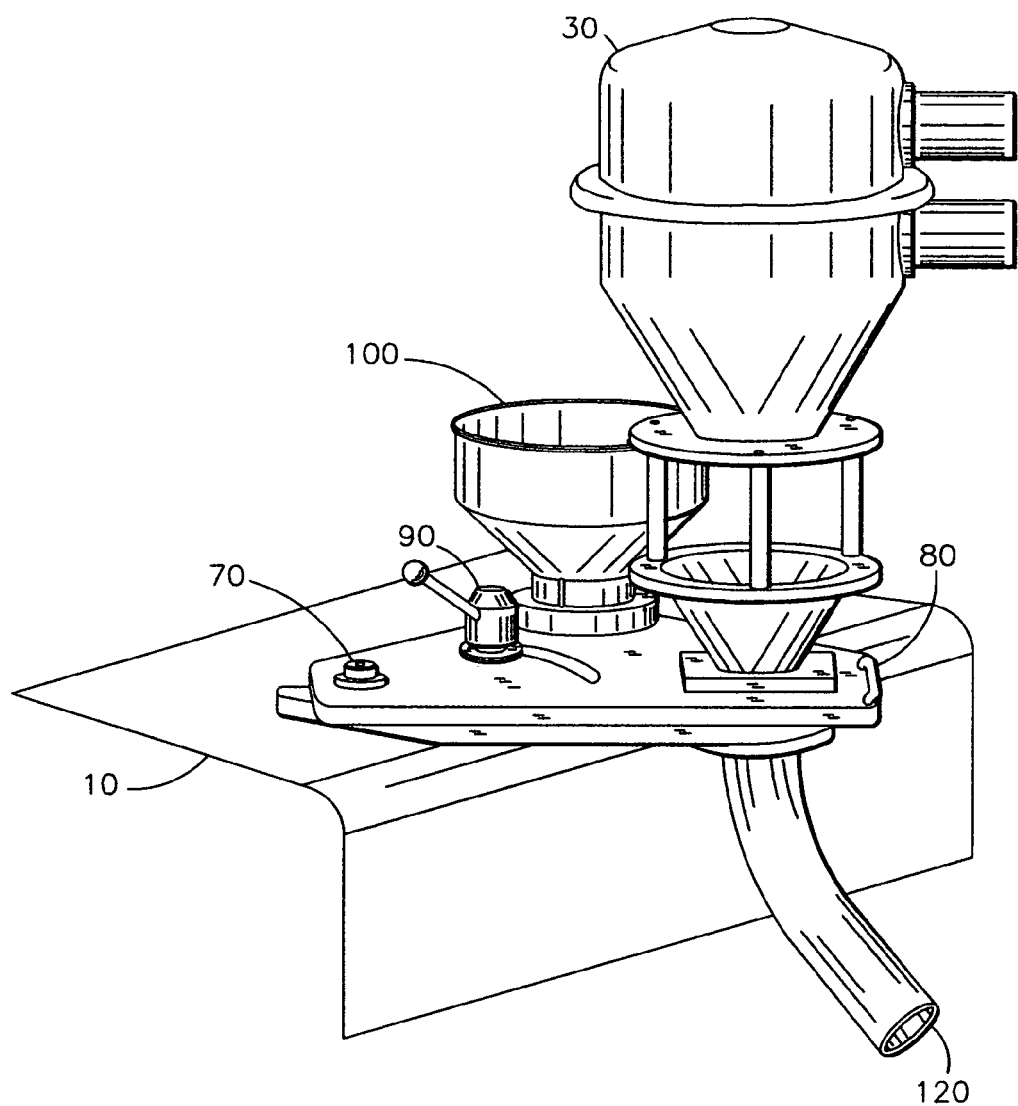
FIG. 2 is an elevated perspective view of the processing machine loader device shown in the purging position. The processing machine is shown schematically in fragmented view beneath the loader device.

The loader device 20 is secured between the processing machine throat (not shown) and the vacuum receiver 30, as shown in FIGS. 1 and 2. In operation, the user grasps handle 80 and pivots the top plate 40 into the operating position, as shown in FIG. 1. The bearing 74 on the pivot shaft 72 between the plates produces smooth and easy single-handed transfer of the top plate 40 from one position to another. In the preferred embodiment of the invention, the plates 40, 60 are sized such that the pivot radius of plate 40 accommodates machine specifications and thus, reduces the degree to which the loader 20 intrudes into the workspace. The pivot design also eliminates the chance of the plates binding and sticking. Additionally, the vacuum receiver 30 and drain tube 120 are closer to the machine as a result, which improves the ease of material changes.

Referring to FIGS. 1, 2, and 3, in the operating position, ports 42, 62 are aligned. Locking handle 90 is rotated and brought to bear against the top surface of the top plate 40 preventing movement of the top plate 40. Processing material is then free to flow from the vacuum receiver, through the ports 42, 62, and into the throat of the machine. The top plate 40 is maintained in the operating position as desired until a process is complete.

Once done, the locking handle 90 is loosened allowing the pivotal plate 40 to be moved into the purging position, as shown in FIG. 2. In the purging position, ports 42 and 64 are aligned so that remaining processing material is free to flow from the vacuum receiver, through the ports 42, 64, and out the drain tube 120 where it is recovered and returned to the Gaylord, or other vessel. In the drain position, the hopper is closer to the edge of the machine for safety and convenience during cleaning. No tools are needed to change the processing material, and once drained, the hopper can be loaded with a different processing material and the steps repeated for another separate process. Time, material, and labor are saved as result.

Additionally, the purge funnel 100 can be used to capture extra material during the purging operation, or it can be conveniently used for short processing runs. For short runs, the purge funnel 100 is positioned over the throat of the machine, as illustrated in FIG. 2, which shows the purging position. In that position, material loaded by hand in the purge funnel can flow freely through ports 44 and 62 and into the throat of the processing machine 10. Machine down time for short runs is eliminated as a result.

Figure 6:
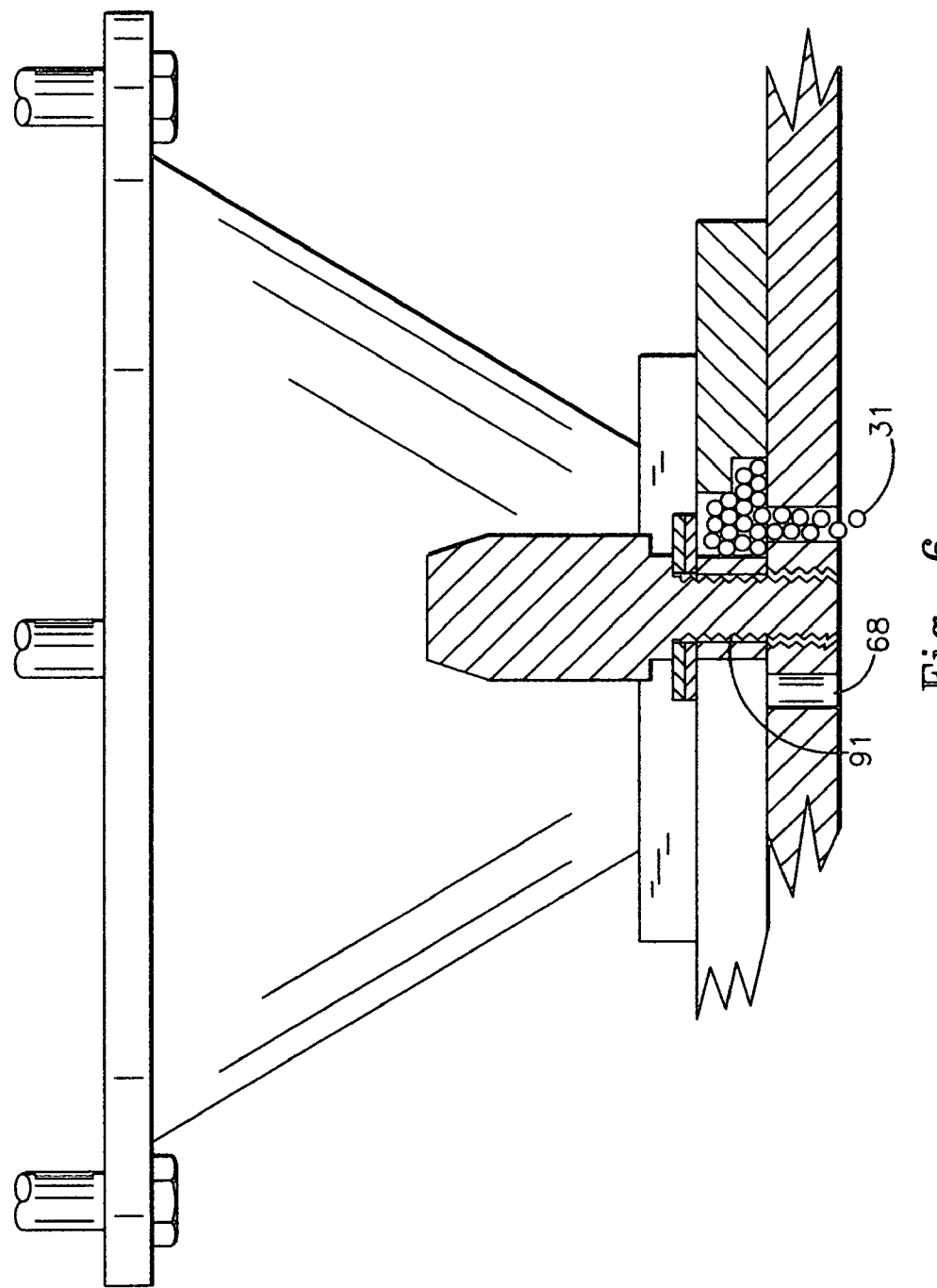
FIG. 6 is a partial side plan view of the loader device of FIG. 1 taken along lines 6.

With reference to FIG. 6, in the event that any processing pellets 31 collect in the arcuate cut out 45 during material changeovers, there is a built-in cleaning system for ridding the cut out of the pellets. This is important because the plates could bind and stick if the material is not removed. As the top plate 40 pivots on top of the bottom plate 60, notches 46 formed at both ends of the cut out collect the pellets 31 and deliver them to the passages 68. Upon contact with the shaft 92 of the locking handle 90, which is threaded 91 in the handle bore 95, the pellets are made to flow through the passages 68 where they may be reclaimed, as shown in FIG. 6.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A loader device for a processing machine of the type wherein material is typically delivered to the throat of the machine by way of a hopper or vacuum receiver, the device comprising:
   a first plate adapted for supporting the hopper or vacuum receiver;
   a second plate adapted for securing to the machine;
   at least one port extending through the first plate, and at least one port extending through the second plate; and,
   pivot means for pivotally securing the first plate and the second plate together such that said first plate slides upon said second plate between an operating position for feeding the material to the machine and a purging position for transferring the material from the hopper to a secondary container.

2. The device of claim 1 further comprising securing means for securing the plates in the operating position, the purging position, or there between.

3. The device of claim 2 further comprising a handle secured to the first plate.

4. The device of claim 1 further comprising a bore extending through each of the plates, and the pivot means includes a pivot shaft extending through the bores and a bearing positioned on the shaft between the plates.

5. A loader device for a processing machine of the type wherein material is typically delivered to the throat of the machine by way of a hopper or vacuum receiver, the device comprising:
- a first plate adapted for supporting the hopper or vacuum receiver;
- a second plate adapted for securing to the machine;
- at least one port extending through the first plate, and at least one port extending through the second plate;
- pivot means for pivotally securing the first plate and the second plate together, wherein the first plate is free to pivot relative to the second plate between an operating position and a purging position,
- an arcuate cutout formed in the first plate; and
- a shaft secured to the second plate, wherein the cutout serves as a passage for the shaft when the first plate pivots relative to the second plate.

6. The device of claim 5 wherein a locking handle is connected to the shaft for securing the plates in the operating position, the purging position, or there between.

7. The device of claim 5 wherein the cutout has a notch at each end for collecting spilled material.

8. A processing machine loader device for a processing machine of the type wherein material is typically delivered to the throat of the machine by way of a hopper or vacuum receiver, the device comprising:
- at least a first plate and a second plate secured together by a pivot such that said first plate slides upon said second plate between an operating position for feeding the material to the machine and a purging position for transferring the material from the hopper to a secondary container;
- at least one port formed in the first plate, and at least one port formed in the second plate;
- a handle secured to the first plate; and
- a locking handle with a shaft attached to the second plate for securing the plates in the operating position, the purging position, or there between.

9. The device of claim 8 wherein the top plate is free to pivot relative to the bottom plate a distance of between about 0 and about 180 degrees.

10. The device of claim 9 further comprising an arcuate cutout formed in the top plate, wherein the cutout serves as a passage for the shaft when the top plate pivots relative to the bottom plate.

11. The device of claim 8 including a second port formed in the top plate.

12. The device of claim 11 including a second port formed in the bottom plate.

13. The device of claim 12 including a purge funnel removably secured to the top plate in alignment with the second port.

14. The device of claim 13 including a drain tube removably secured to the bottom plate in alignment with the second port.

15. A loader device for a processing machine of the type wherein material is typically delivered to the throat of the machine by way of a hopper or vacuum receiver, the device comprising:
- at least a first plate and a second plate secured together by a pivot;
- at least one port formed in the top plate, and at least one port formed in the bottom plate;
- a handle secured to the top plate;
- a locking handle with a shaft attached to the bottom plate for securing the plates in an operating position, a purging position, or therebetween; and,
- an arcuate cutout formed in the top plate, wherein the cutout serves as a passage for the shaft when the top plate pivots relative to the bottom plate.

16. A loader device for a processing machine of the type wherein material is typically delivered to the throat of the machine by way of a hopper or vacuum receiver, the device comprising:
- a first plate;
- a second plate;
- at least one port extending through each plate; and
- a pivot securing the plates together such that the first plate slides upon and remains in surface contact with the second plate as the first plate moves relative to the second plate between an operating position for feeding the material to the machine and a purging position for transferring the material from the hopper to a secondary container.

17. A processing machine loader device for a processing machine of the type wherein material is typically delivered to the throat of the machine by way of a hopper or vacuum receiver, the device comprising:
- a bottom plate for securing to the machine;
- at least one top plate;
- at least one port extending through each plate; and,
- a pivot securing the plates together, the at least one top plate sliding upon and remaining in surface contact with said bottom plate as the at least one top plate moves between an operating position for feeding the material to the machine and a purging position for transferring the material from the hopper to a secondary container.

18. The device of claim 17 further comprising means for securing the at least one top plate in the operating position, the purging position, or therebetween.

19. The device of claim 17 further comprising a bore extending through each of the plates, and the pivot includes a pivot shaft extending through the bores and a bearing positioned on the shaft between the plates.

20. The device of claim 17 further comprising a handle secured to the at least one top plate.

* * * * *